United States Patent [19]
Scalzo et al.

[11] 3,874,711
[45] Apr. 1, 1975

[54] GAS TURBINE EXHAUST SYSTEM EXPANSION JOINT

[75] Inventors: Augustine J. Scalzo, Philadelphia, Pa.; Chandrakant C. Shah, Ahmedabad, India

[73] Assignee: Westinghouse Electric Corporation, Pittsburgh, Pa.

[22] Filed: Feb. 6, 1974

[21] Appl. No.: 440,103

[52] U.S. Cl. ............................ 285/236, 138/149
[51] Int. Cl. ...... F16l 21/00, F16l 27/10, F16l 51/02
[58] Field of Search .......... 285/235, 236, 226, 229, 285/149, 45, 242-254; 138/139, 140, 149

[56] References Cited
UNITED STATES PATENTS

| | | | |
|---|---|---|---|
| 2,703,109 | 3/1955 | Saville | 285/235 X |
| 3,315,704 | 4/1967 | Shire | 285/226 X |
| 3,462,177 | 8/1969 | Skinner et al | 285/149 |

*Primary Examiner*—Geo. V. Larkin
*Attorney, Agent, or Firm*—G. H. Telfer

[57] ABSTRACT

A flexible band comprised of several layers of different types of fiberglass and reinforced asbestos is employed to form a portion of an exhaust expansion joint for a gas turbine exhaust system. The band has radially inner and radially outer layers of fibrous high temperature metal reinforced asbestos to provide the expansion joint with structural integrity and membrane strength generally required in high back pressure gas turbine units.

4 Claims, 3 Drawing Figures

PATENTED APR 1 1975 3,874,711
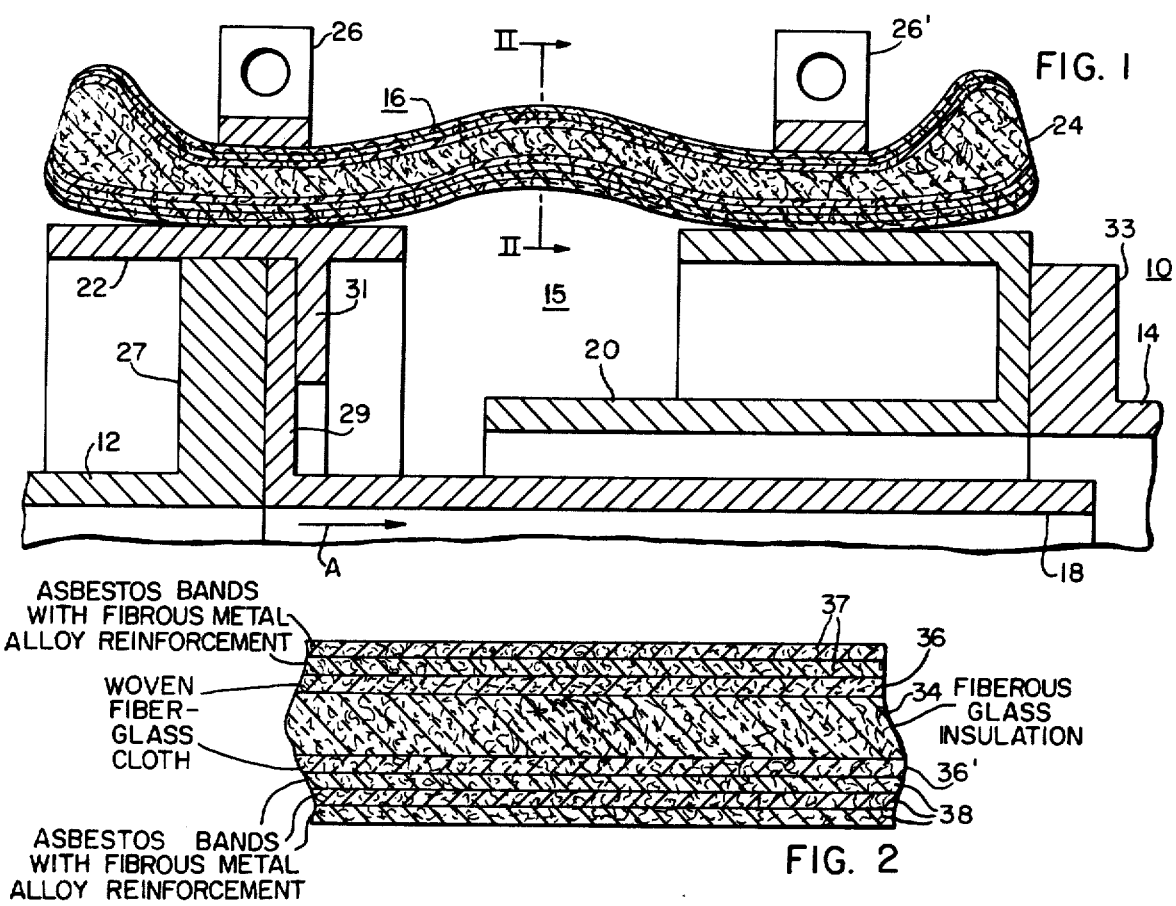
FIG. 1
FIG. 2
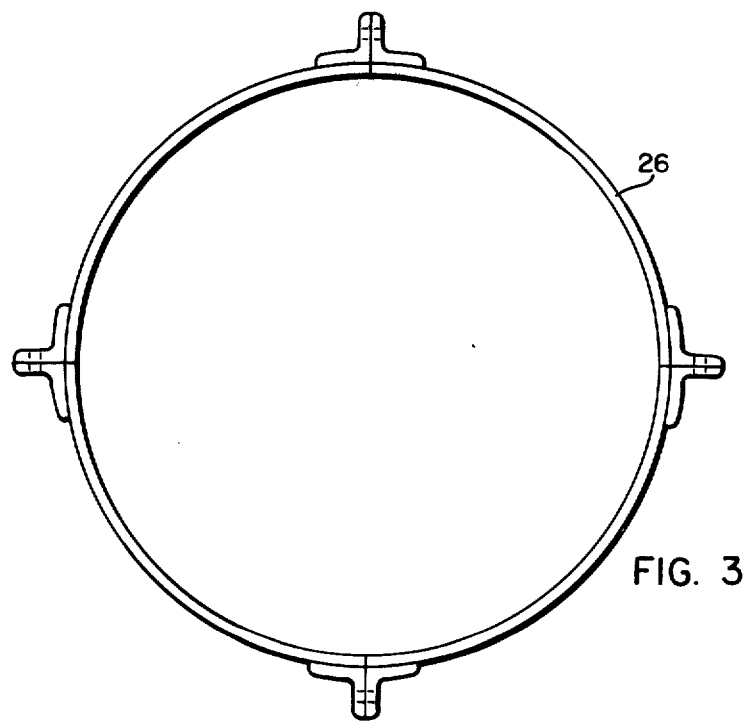
FIG. 3

GAS TURBINE EXHAUST SYSTEM EXPANSION JOINT

BACKGROUND OF THE INVENTION

1. Field of the Invention:

This invention relates to gas turbines and more particularly to expansion joint structures for use with gas turbine exhaust systems.

2. Description of the Prior Art:

Present expansion joint structures include metallic fabrics and metallic members that yield to the stresses and motion of the gas turbine and exhaust duct systems. The life cycle of these present expansion joints is very limited, however, and is subject to failure in fatigue under a back pressure of twenty inches of water. The life cycles are sometimes not more than 50 hours.

The present commercial expansion joints are also susceptible to foreign object damage, to failure by a low damping capacity, and to failure due to flutter of the connecting duct work.

SUMMARY OF THE INVENTION

The present invention provides a simple, yet effective structure for maintaining fluid communication and for the preventing of fluid leakage between a gas turbine exhaust duct and a gas turbine exhaust stack. A flexible seal arrangement is disposed about the juncture of two axially adjacent exhaust fluid passageways. Inner and outer flow liners within the passageways minimize flow excitation of the joint which would cause flutter failure. The flexible seal is disposed outwardly of the flow liners. The flexible seal has clamps at each end to secure it to the gas turbine exhaust duct and the exhaust stack, respectively. The flexible seal is comprised of an intermediate insulation and vibration damping band of fibrous glass mat supported both inwardly and outwardly by layers of woven fiberglass cloth. Three layers of a high temperature nickel copper alloy, reinforced asbestos layer are disposed inwardly of the inner woven fiberglass cloth layer and two layers of the high temperature nickel copper alloy reinforced asbestos are disposed outwardly of the outer layer of fiberglass cloth, providing structural integrity and member strength capacity to resist failures that are common to the prior art.

BRIEF DESCRIPTION OF THE DRAWINGS

The invention along with the objects and advantages thereof will be best understood from the following detailed description taken in conjunction with the accompanying drawings in which:

FIG. 1 is a partial side elevational view of a gas turbine exhaust system expansion joint constructed according to the principles of this invention;

FIG. 2 is a transverse elevational view taken along the line II—II of FIG. 1; and FIG. 3 is a side view of a clamping arrangement for the expansion joint.

DESCRIPTION OF THE PREFERRED EMBODIMENT

Referring to the drawings in detail, and particularly to FIG. 1, there is shown a portion of a gas turbine exhaust system 10. The flow of the exhaust gases is in the direction from left to right as indicated by the arrow A. The exhaust gases are the product of combustion of the fuel and air being burned in combustors, not shown, thereupon passing through and hence causing rotation of a plurality of airfoil turbine blades, also not shown. The gases are thereafter passed out an exhaust duct annulus 12, on the turbine, to an exhaust gas stack passageway 14.

Disposed at a junction 15 between the contiguous arrangement of exhaust fluid passageways 12 and 14, is a gas turbine exhaust system expansion joint 16. The expansion joint includes an inner flow liner 18, an outer flow liner and downstream annular support ring 20, an upstream annular support ring 22, a flexible seal member 24, and a pair of clamps 26 and 26'.

The exhaust duct annulus 12 has an annular flange 27 to which an annular flange 29 of the inner flow liner 18 and an annular flange 31 of upstream support ring 22 are attached, in any suitable manner, not shown.

The exhaust gas stack passageway 14 has an annular flange 33 to which the outer flow liner and downstream support ring 20 is attached, in any suitable manner, not shown. The inner liner 18 and the outer liner 20 are generally coaxial, and have a generally telescoping overlapping relationship with one another. This overlapping relationship prevents the hot exhaust gases from causing excessive flow excitation about the joint 16 which could cause flutter failure therein.

The flexible seal member 24 is comprised of layers or bands of woven fiberglass cloth, an insulating and vibration damping layer of matted glass fibers, and high temperature metal reinforced asbestos. The asbestos bands or layers are reinforced with a fibrous metal alloy, the composition of which essentially comprises 67 percent nickel and 30 percent copper, such alloy being marketed by the International Nickel Company under the tradename "Monel." The flexible seal member 24, a portion of which is shown in cross-section in FIG. 2, more particularly, is comprised of an intermediate band of a matted fibrous glass insulation 34. Both radially outwardly and radially inwardly of the band of matted fibrous glass insulation 34 are bands or layers of woven fiberglass cloth 36 and 36' respectively. The intermediate band of matted fibrous glass insulation 34 provides the joint 16 with insulation and damping capacity, while the bands of woven fiberglass cloth 36 and 36' contain and protect the band of matted fibrous glass insulation 34. Radially outwardly of the outer woven fiberglass cloth band 36, there are disposed two bands of a high temperature nickel-copper alloy, "Monel," reinforced asbestos 37. Radially inwardly of the inner fiberglass cloth band 36', there are disposed three bands of a high temperature nickel-copper alloy, "Monel," reinforced asbestos 38.

The upstream side of the flexible seal 24 is clamped against the upstream annular support ring 22 which encompasses the annular flange 27 of the gas turbine exhaust duct 12, as shown in FIG. 1. The downstream side of the flexible band 24 is clamped against the downstream annular support ring 20, which is attached to the annular flange 33 of the exhaust gas stack passageway 14. The clamp 26 shown in FIG. 3 takes the peripheral configuration of the support rings 22 and 20. The clamp 26 shown in FIG. 3 is generally circular, but other forms may include square or polyhedral configurations if the passageways 12 and 14 have a square or non-circular cross-section. The flexible seal 24 itself may be formed as a continuous arrangement of bands, or it may be formed from a finite length of multibanded material, wrapped about the periphery of the junction 15 and overlapping itself to provide the sealing arrangement.

Though the invention has been described with a certain degree of particularity, changes may be made therein without departing from the spirit and scope thereof. For example, the invention has been described using a certain type of high temperature alloy for reinforcing the asbestos. Another type of high temperature material may be used to reinforce the asbestos; and the number of bands therein may be changed to suit specific requirements. Additionally, the liners 18 and 20 may have a more elaborate interlocking arrangement to make a more complete seal between themselves.

We claim as our invention:

1. An expansion joint for a gas turbine exhaust system comprising:
    an exhaust duct for a gas turbine;
    an exhaust gas stack for a gas turbine installation;
    said exhaust duct from said gas turbine and said exhaust gas stack for said gas turbine installation having a junction therebetween permitting passage of exhaust gas therethrough;
    a flexible sealing member disposed about said junction of the exhaust gas duct and the exhaust gas stack;
    each edge of said flexible sealing member being secured to said exhaust gas duct and said exhaust gas stack by clamping members circumferentially disposed thereon;
    said expansion joint also comprising an inner flow liner and an outer flow liner; and
    said flexible sealing member including layers of fiberglass and layers of high temperature metal alloy reinforced asbestos.

2. An expansion joint for a gas turbine exhaust system as recited in claim 1, wherein said flexible sealing member comprises:
    an intermediate insulating band of matted glass fibers;
    at least one band of woven fiberglass cloth disposed on the inner side of said intermediate insulating band of matted glass fibers and at least one band of woven fiberglass cloth disposed on the outer side of said intermediate insulating band of matted glass fibers;
    at least three bands of high temperature alloy metal reinforced asbestos disposed on the inner side of the woven fiberglass cloth; and
    at least two layers of high temperature metal alloy reinforced asbestos disposed on the outer side of the woven fiberglass cloth, said intermediate insulating band of matted glass fibers providing said expansion joint with damping capacity, said woven fiberglass cloth layers containing and protecting said intermediate insulating band of matted glass fibers, and said high temperature metal alloy reinforced asbestos providing structural integrity to said expansion joint.

3. An expansion joint for a gas turbine as recited in claim 2 wherein the high temperature alloy for reinforcing the asbestos bands is a material essentially comprised of 65 percent nickel and 30 percent copper.

4. An expansion joint for a gas turbine exhaust system as recited in claim 2, wherein the overall circumferential configuration of said expansion joint is generally circular.

* * * * *